Feb. 25, 1941.   I. E. McCABE   2,232,957
CHANGE ANTICIPATING THERMOSTAT
Filed July 27, 1938
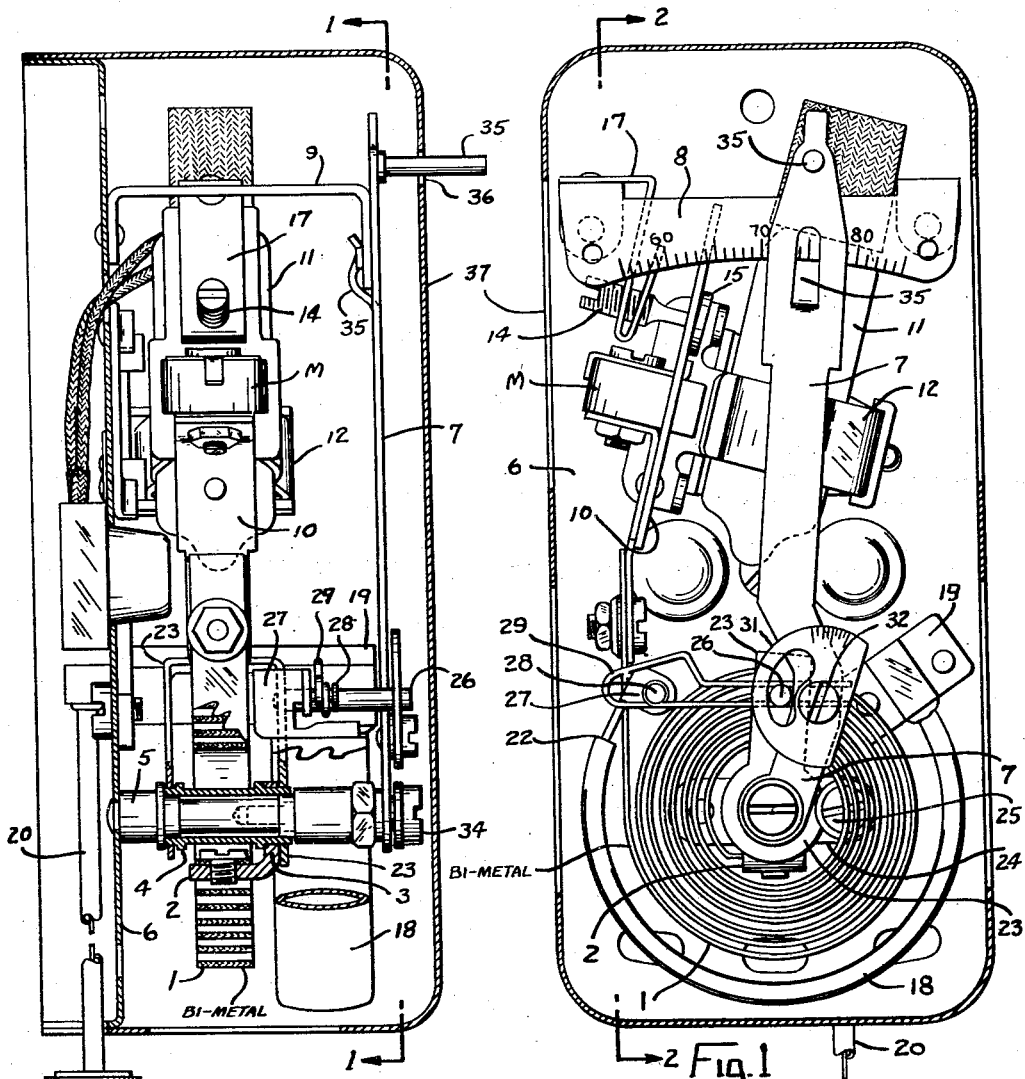
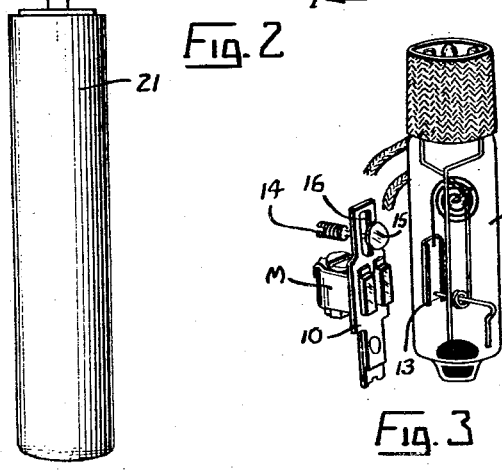
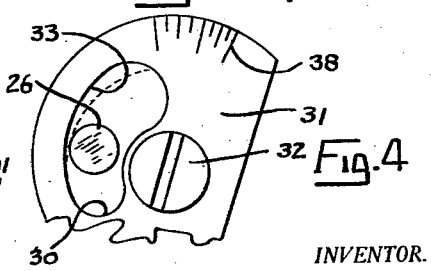
INVENTOR.
IRA E. McCABE
BY Langun Mum
ATTORNEY.

Patented Feb. 25, 1941

2,232,957

UNITED STATES PATENT OFFICE 2,232,957

CHANGE ANTICIPATING THERMOSTAT

Ira E. McCabe, Chicago, Ill.

Application July 27, 1938, Serial No. 221,645

18 Claims. (Cl. 200—139)

This invention relates to electric controls and more particularly to the construction of a thermostat for controlling the temperature or condition of the air within a space wherein the thermostat is located by opening and closing an electric circuit for controlling the operation of an apparatus designed to produce the condition of the air within the space demanded by the thermostat, and in addition thereto, to anticipate a desired change in that demand responsive to changes in exterior atmospheric conditions.

Thermostats have long been used for controlling the operation of automatically controlled heating plants for the purpose of establishing a desired temperature in a space to be heated. These devices operate on a differential in temperature, which may be one degree, to call for an operation of the heating plant upon a drop in the temperature of the space to be heated and to stop said operation when the temperature of the space has risen an amount equal to the operating differential of the thermostat.

With these conventional types of thermostats it has been possible, when constructed to be very sensitive to temperature changes, to open and close a circuit upon a change of one degree temperature at the thermostat. It has also been possible to maintain the temperature of the space substantially at the setting of the thermostat, when a temperature differential exists between the space to be heated and a space exterior therefrom, such as the outdoors, providing the exterior temperature difference is established by a slow change in temperature or remains substantially around a certain degree. The conventional types of thermostats have proven inadequate when quick or drastic changes in exterior temperature occur, whether they be toward higher or lower temperatures, to prevent such changes from resulting in an over or under temperature condition in the space to be heated. This can be attributed to a delay in modifying the effect of such exterior temperatures upon the interior space, whereby, when the thermostat does finally operate, either to stop or start the heating plant, the effect of a rising exterior temperature when the plant is operating may produce an overtemperature condition in the space, and when the exterior temperature is falling, the lag in the heating plant in responding to produce the demand made by the thermostat produces an undertemperature condition.

With the best of thermostatic control operation it is natural for the space temperature to decline somewhat after influencing the thermostat to start the heating plant, due to the time required of the plant to produce heat and a slight increase in space temperature is to be expected after the thermostat demand has been met, due to the continued heating effect of the high temperatures produced at the heating source. While these variations may be slight—say, only one degree, and not ordinarily influencing the state of temperature comfort within the space to be heated, they may materially contribute to a state of discomfort, should drastic changes in exterior conditions occur.

It is an object of this invention to produce an instrument of this character which may be manually set to maintain a desired predetermined condition within the space, such as within a building, and at the same time to anticipate changes resulting from sudden changes of exterior temperatures affecting the interior conditions, and by so doing, nullify such effect whereby the condition indicated by the manual setting of the thermostat does not apparently vary.

The advantages of this improved thermostat may be demonstrated readily when it is connected to control the operation of an oil burner employed in a hot water heating system. The thermostat is located in a room in the building heated by this system wherein, for example, a temperature of 70° is desired. When the thermostat is so set, and the temperature of the room drops, for example, to 69°, the room thermostat operates to close the circuit to start the operation of the oil burner which will continue operation until the temperature of the room reaches 70° when the thermostat will operate to open the circuit and the oil burner will cease to function. With the commercial types of thermostats, if a quick change in outdoor temperature occurs, the effect upon the interior of the dwelling may be too great for the heating system to modify or to correct immediately. A quick appreciable decline in outdoor temperature will make itself felt within the interior of the dwelling and will require an extended period of operation of the heating plant before the predetermined temperature is again established, this being especially noticeable in a hot water heating system because of the temperature of the volume of water to be raised when the thermostat calls for heat. The necessary delay in bringing up the temperature of the water to offset the influence of outdoor cold may result in a state of discomfiture in the dwelling, and the reverse is true upon a quick appreciable increase in the outdoor temperature.

This invention contemplates providing means for raising the thermostat demand when the outdoor temperature is declining and to lower the demand when the outdoor temperature is raising to anticipate and nullify the effect upon the interior of the dwelling in either case.

If a sudden drastic drop in outdoor temperature takes place, the raising of the thermostat setting causes a heating of the heating medium to occur sooner than with a thermostat responding only to changes in temperature within the room. On the other hand, if the temperature of the heating medium has been considerably increased to meet the demand of the room thermostat during a prevailing outdoor temperature, and a rise in outdoor temperature begins, the heating medium in the heating system at such high temperatures tends to maintain the predetermined temperature in the dwelling after the room thermostat has opened the oil burner circuit. Under such a condition this improved thermostat delays the next call of heat by the room thermostat and as a result prevents overheating of the dwelling.

This improved device actually follows the trend of outdoor temperatures to raise the demand of the room thermostat as soon as outdoor temperature is falling, or to decrease the demand when the outdoor temperature is rising and maintain the temperature within the dwelling at the setting.

With these and other objects in view, reference is made to the accompanying sheet of drawing which illustrates a preferred form of this invention, with the understanding that detail changes may be made without departing from the scope thereof.

In the drawing:

Figure 1 is a view in section taken on the line 1—1 Figure 2, looking in the direction of the arrows, illustrating the parts embodied in this invention in front elevation.

Figure 2 is a view similar to Figure 1 taken on the line 2—2 of Figure 1, looking in the direction of the arrows, illustrating the said parts in side elevation.

Figure 3 is a detail view in perspective of the mercury tube switch and magnetic operator therefor.

Figure 4 is an enlarged fragmentary detailed view of the adjustable anticipating control plate.

In the embodiment of this invention illustrated, a thermostatic coil 1 is provided with the inner end of the coil secured to one end of a bracket 2 provided with a right angular extension 3 mounted upon a sleeve 4. The sleeve 4 is freely mounted upon a post 5 extending from a base plate 6. The lower end of a temperature adjusting lever 7 is mounted upon the end of the post 5 to allow the upper end of the lever 7 to be moved into an adjusted position upon a scale plate 8 mounted on a bracket 9 supported upon the base plate 6. The free end of the coil 1 is secured to a plate 10 in prolongation thereof. The plate 10 adjustably mounts thereon a fixed magnet M. By connecting the coil bracket with the adjusting lever so that movement of the inner end of the coil is prevented after adjustment by the lever, the response of the thermostatic coil 1 to changes in temperature will cause the coil to move the magnet M toward or away from a mercury tube switch 11 rigidly mounted upon the base plate 6 by a bracket clamp 12.

The mercury tube switch 11 is preferably of the type illustrated in detail in Figure 3 and fully disclosed in Patent No. 2,085,316, dated June 29, 1937, wherein one electrode mounts an armature 13 which will be influenced by the magnet M when adjacent the exterior of the tube to close the connection through the switch and when the magnet is moved to carry its magnetic field away from the tube sufficiently to free the armature 13, the switch will open. It is preferable to guide and limit the path of travel of the free end of the plate 10 carrying the magnet M by passing a screw threaded pin 14 having an enlarged head 15 through an elongated slot 16 in the end of the plate 10 to be adjustably received by a bracket 17 mounted upon the base plate 6, such as by being attached at one end to the bracket 9.

With the pivoted end of the temperature adjusting lever 7 provided with a connection to which the inner end of the coil is secured, the free end of the lever may be moved upon the scale 8 to a predetermined temperature indicating position and when this temperature is reached within the room the coil 1 will expand to move the magnet end away from the switch tube 11 to open the circuit through the switch and when the temperature of the room drops below the predetermined degree the coil will contract and move the magnet M into position to close the circuit through the switch.

The above is a general description of a commercial room thermostat now on the market for controlling the operation of an electrically operated and controlled heating plant.

In addition to this construction, this invention contemplates the provision of a Bourdon tube 18 preferably arranged concentrically about the thermostatic coil 1 with one end mounted upon a bracket 19 secured upon the base plate 6. The interior of the Bourdon tube at this end is connected through a passageway in the bracket 19 to communicate with the interior of a tube 20 mounted upon the back of the casing 6 and extending through the bottom thereof to terminate in connection with the interior of a bulb 21 filled with a liquid responsive to temperature changes, such as acetone. The tube 20 is of such length that the bulb 21 may be placed in a position where it will be responsive to the changes in temperature upon the exterior of the building containing the room thermostat. Variation in temperature of the exterior atmosphere will cause the Bourdon tube 18 to expand and contract and will impart a movement to the free end 22.

In order that this movement may be employed to alter the normal calibration of the thermostatic coil 1, a U shaped bracket 23 is mounted to embrace the coils of the thermostatic coil in spaced apart relation thereto with its free ends perforated to receive the ends of the sleeve 4. The portion 3 of the bracket 2 mounted upon the sleeve 4 is provided with a lateral extension 24 which is adjustably secured to one arm of the bracket 23, also mounted upon the end of the sleeve 4, by a clamp 25 screw threaded into said extension 24. That arm of the bracket 23 is provided with a pin 26 extending into the path of movement of the temperature adjusting lever 7.

The free end 22 of the Bourdon tube 18 supports a bracket 27 which carries a pin 28 in parallel relation to the pin 26. A hairpin spring 29 is secured upon the pin 28 with its free ends in sufficient frictional engagement with opposite sides of the pin 26 to impart movement to the pin 26 upon movement of the free end 22 of the Bourdon tube.

The end of the pin 26 upon the U shaped bracket 23 passes through an arcuate slot 30 of irregular shape in an adjustable anticipating control plate 31 adjustably mounted on the temperature adjusting lever 7 by a set screw 32. The edge of the slot 30 adjacent the set screw 32 is concentric therewith. The edge 33 of the slot is formed on the arc of a circle eccentric to the inner edge, as shown in Figure 4, to depart from the lower side at a tangent from a concentric arc, shown in dotted lines, so that the slot 30 is wider at the top than at the bottom, for a purpose hereinafter described.

The temperature adjusting lever 7 is adjustably secured to the end of the post 5 by a set screw 34, and frictionally engages the plate 8 by the struck out portion 35 at the upper end being bent to engage the rear of the plate 8, exposing the scale on the plate, and mounts a pin 35 thereabove adapted to pass through an arcuate slot 36 in the cover 37 to adjust the free end of the lever 7 at the predetermined temperature, the cover being provided above the slot 36 with a scale corresponding to the scale on the plate 8.

In calibrating this instrument it must first be determined to what extent the operation of the Bourdon tube 18 is to affect the setting of the lever 7. Assuming the desired change in the setting, from that indicated by the temperature lever 7 is ½° higher, upon falling outdoor temperatures, and ½° lower upon rising outdoor temperatures, the anticipating control plate 31 secured to the adjusting lever 7 is shifted to lock the U bracket pin 26 against the lever; the clamp screw 25 on the coil support extension 24 is loosened, and the bi-metal coil 1 adjusted so that the magnet switch M is opened at room temperature with the lever 7 indicating a temperature ½° lower, whereafter the clamp screw 25 is tightened to clamp the coil support 3 and U bracket 23 together. Next the anticipating control plate 31 is moved to provide a 1° movement of the lever 7 before the plate contacts the pin 26.

The formation of the anticipating control plate 31, in the manner previously described permits a fine adjustment to be made when establishing the degree change in thermostat setting to be affected by the outdoor responsive element and for this purpose may be calibrated, as shown by scale 38, Figure 4, to indicate fractional degrees of adjustment. When the lever 7 is then set at room temperature, the U bracket pin 26 rests midway between its movable limits. Response of the bi-metal coil 1 to ambient temperatures will move the magnet M without changing the position of the bracket pin 26, because of the resistance offered by the hairpin spring clutch 29 to the movement of the inner end of the coil.

The spring clutch 29 acts to move the pin 26, between the lever 7 and control plate 31 immediately in response to directional changes in the movement of the free end of the Bourdon tube and allows continued movement of the tube in the same direction after movement of the pin 26 has been stopped. Therefore, when the outdoor temperature to which the bulb 21 is subjected falls, the free end of the Bourdon tube moves the U bracket pin 26 into engagement with the temperature adjusting lever 7 and the fixed end of the bi-metal coil 1 is rotated, thus raising the operating point for opening the switch ½°, and when the outdoor temperature shifts to a rising temperature, the bi-metal setting is lowered ½°. For most purposes, a change of 5° in outdoor temperature is sufficient to warrant a change in the usual thermostat adjustment.

The screw adjustment with the magnet abutment 15, supported by bracket 17, is for the purpose of adjusting the nearness of the magnet M to the magnetic switch 11 whereby the necessary temperature change in the bi-metal coil 1 to open and close the switch may be varied. Adjustment may be made with the structure disclosed to provide operation upon ½° change in coil temperature above or below the temperature setting of lever 7.

The foregoing description has disclosed a thermostatically controlled switch for controlling the operation of a heating plant to maintain a desired temperature without appreciable variation and operative to nullify or to minimize the effect of changes in exterior temperatures upon the temperature of the space to be heated without the necessity of compensating for them manually. In the structure disclosed, a combination of a thermal element and an expansible and contractible element has been shown as the temperature responsive elements through which operation of the switch is obtained. These elements may be substituted for each other, or dual expansible and contractible power elements, such as the Bourdon tube type disclosed, or bellows, may be employed, if desired, to produce the operative structure of this invention without departing from the scope thereof.

Furthermore, the bi-metallic element may be replaced by pressure responsive means with the Bourdon tube retained as a temperature responsive element to alter the pressure settings in response to exterior temperature changes. This latter combination of pressure and temperature responsive elements provide a device which may be used to control a heating plant where the use of remote thermostatic control is neither desirable nor practical such as in apartment buildings, or other large structures, by controlling the heat deliverable to the building through the maintenance of a predetermined condition at the source and varying that condition in accordance with changes in outdoor temperatures.

This invention may be used for controlling temperatures for cooling purposes as well as for heating purposes.

What I claim is:

1. A change anticipating thermostat including an electric switch, a thermal member responsive to changes in ambient temperature, means for opening and closing the switch actuated by said thermal member, an expansible and contractible member responsive to changes in exterior temperature, and means actuated by the expansible and contractible member upon an initial change in the trend of exterior temperature, to change the degree of temperature responsiveness within predetermined limits of the thermal member to operate the switch, increasing said degree of responsiveness upon decreasing exterior temperature and decreasing said degree of responsiveness upon increasing exterior temperatures, wherein the thermal member is provided with a manually operable adjusting lever to determine the temperature at which the thermal member operates the switch, and the means operating within predetermined limits includes means for adjusting said limits.

2. A change anticipating thermostat including an electric switch, a thermal member responsive to changes in ambient temperature, switch actuating means carried on one end of the thermal member, a manually operable adjusting lever connected to the other end of the thermal member to determine the temperature at which the switch actuating means will operate the switch, an expansible and contractible member responsive to changes in exterior temperature, and means actuated by the movements of said member connected to the lever end of the thermal member, upon a reversal in the direction in the trend of exterior temperature, for advancing and retarding, within predetermined limits, the response of the thermal member to changes in ambient temperature from the switch operating temperature determined by the adjusting lever.

3. A change anticipating thermostat including an electric switch, a thermal member responsive to changes in ambient temperature, switch actuating means carried on one end of the thermal member, a manually operable adjusting lever connected to the other end of the thermal member to determine the temperature at which the switch actuating means will operate the switch, an expansible and contractible member responsive to changes in exterior temperature, and means actuated by the expansible and contractible member upon a reversal in exterior temperature connected to the lever end of the thermal member for advancing and retarding within predetermined limits the response of the thermal member to changes in ambient temperature from the switch operating temperature determined by the adjusting lever, advancing said response upon decreasing exterior temperature and retarding said response upon increasing exterior temperature.

4. The structure of claim 3, wherein the thermal member is in the form of a coil of bi-metallic metal, and the connection between one end of the coil and the adjusting lever includes a rotatable bracket connected to the interior end of the coil and a lost motion connection between the bracket and the adjusting lever.

5. The structure of claim 3, wherein one end of the expansible and contractible member is fixed and the means actuated by the movement of said member includes a frictional connection between the movable end of said member and the connection of the thermal element to the adjusting lever.

6. The structure of claim 3, wherein the thermal member is in the form of a coil of by-metallic metal, and the connection between one end of the coil and the adjusting lever includes a rotatable bracket connected to the interior end of the coil and a lost motion connection between the bracket and the adjusting lever, and wherein one end of the expansible and contractible member is fixed and the means actuated by the movement of said member includes a frictional connection between the movable end of said member and the connection of the thermal element to the adjusting lever.

7. The structure of claim 3, wherein the thermal member is in the form of a coil of bi-metallic metal and the connection between one end of the coil and the adjusting lever includes a rotatable bracket connected to the interior end of the coil mounting pin and a lost motion connection between the pin and adjusting lever, and wherein one end of the expansible and contractible member is fixed and the means actuated by the movement of said member includes a frictional connection between the movable end of said member and the bracket pin, whereby the movements of the expansible and contractible member impart rotation to the bracket within the limits of the lost motion connection to the adjusting lever.

8. A change anticipating room thermostat including a magnetically operated electric switch, a coil of bi-metallic metal responsive to changes in ambient temperature, a magnet upon the outer end of the coil adapted to actuate the switch, a post mounted axially of the coil, a bracket mounted on the post and connected to the inner end of the coil, an adjusting lever mounted at one end on the post, a temperature scale over which the free end of the lever is adapted to be moved, a plate having an arcuate slot mounted upon the lever and a pin mounted on the bracket adapted to enter said arcuate slot, a Bourdon tube having one end fixed and the movable end responsive to changes in exterior temperature, and a connection between the movable end and the pin on the coil bracket, whereby upon reversals in exterior temperature a movement is imparted to the coil bracket pin within the limits of the lever plate arcuate slot.

9. The structure of claim 8, wherein the slotted plate engaging the bracket pin is adjustably mounted upon the adjustable lever, and the arcuate slot therein increases in width from one end to the other to vary the limit of travel of the pin therein.

10. The structure of claim 8, wherein the connection between the movable end of the Bourdon tube and the bracket pin includes a frictional engagement with the pin allowing for the movement of the Bourdon tube in either direction after the pin has engaged the plate to slide over the pin.

11. The structure of claim 8, wherein the inner end of the coil is secured to a bracket rotatable upon the post and the pin carrying bracket adjustably connected to the coil attached bracket whereby the thermostat may be calibrated to open and close the switch to the temperature indicated by the adjustable lever and the slotted plate engaging the bracket pin is adjustably mounted upon the adjustable lever and the arcuate slot therein increases in width from one end to the other to vary the limit of travel of the pin therein and the adjustable plate calibrated so that the anticipating movement of the coil by the Bourdon tube may be determined.

12. A control device including an electric switch, a power actuating element responsive to one source of operating energy, means for opening and closing the switch actuated by said power element, a second power element responsive to another source of operating energy, and means, actuated by the second power element, upon a reversal of the movement of the second power element in response to changes in its source of energy, to change the degree of operative responsiveness within predetermined limits of the first element to operate the switch, wherein the first power actuating element is provided with manually operated means for adjusting the said element for a predetermined operation of the switch, and wherein the means actuated by the second power actuating element varies the adjustment of the said first power actuating element, within said predetermined limits, independently of the manual means.

13. A change anticipating thermostat including an electric switch, a temperature responsive member responsive to changes in ambient temperature, means for opening and closing the switch actuated by said member, a second temperature responsive member responsive to changes in exterior temperature, and means actuated by the second temperature responsive member upon a reversal of exterior temperature, to change the degree of temperature responsiveness within predetermined limits of the first temperature responsive member, wherein the first temperature responsive member is provided with manually operable adjusting means for determining the temperature at which the said member operates the switch, and wherein the means actuated by the second temperature responsive member varies the adjustment of the first temperature responsive member within said predetermined limits, independently of the manual means.

14. A change anticipating thermostat including an electric switch, a thermal member responsive to changes in ambient temperature, means for opening and closing the switch actuated by said thermal member, an expansible and contractible member responsive to changes in exterior temperature, and means actuated by the expansible and contractible member upon an initial change in the trend of exterior temperature, to change the degree of temperature responsiveness within predetermined limits of the thermal member to operate the switch, increasing said degree of responsiveness upon decreasing exterior temperature and decreasing said degree of responsiveness upon increasing exterior temperatures, wherein the thermal member is provided with a manually operable adjusting lever to determine the temperature at which the thermal member operates the switch, with the means operating within predetermined limits including means for adjusting said limits, and wherein said last named means is mounted upon the adjusting lever to limit the adjustment of the thermal member by said last named means.

15. A change anticipating thermostat including an electric switch, a thermal member responsive to changes in ambient temperature, means for opening and closing the switch actuated by said thermal member, an expansible and contractible member responsive to changes in exterior temperature, and means actuated by the expansible and contractible member to substantially immediately raise the temperature responsiveness of the thermal member a predetermined degree, within predetermined limits, upon an initial drop in exterior temperature and likewise lower the responsiveness of the thermal member upon an initial rise in exterior temperature, said means, irrespective of the extent to which the exterior temperature rises or falls, operative only throughout the initial stage of exterior temperature change necessary to affect the responsiveness of the thermal member.

16. The structure of claim 15, wherein the last named means includes means allowing unrestricted operation of the expansible and contractible member in response to continued changes in exterior temperature beyond those required to change the degree of temperature responsiveness of the thermal member.

17. A control device including an electric switch, a power actuating element responsive to one source of operating energy, means for opening and closing the switch actuated by said power element, a second power element responsive to another source of operating energy, and means actuated by the second power element to substantially immediately raise the degree of operative responsiveness of the first power element a predetermined degree, within predetermined limits, upon an initial decrease in the operating effect of the second power element and likewise lower the responsiveness of the first power element upon an initial increase in the operating effect of the second, power element, said means, irrespective of the extent to which the responsiveness in the operating effect of the second power element increase or decreases, operative only throughout the initial stages of the changes in the operative effect of the second power element necessary to affect the responsiveness of the first power element.

18. A change anticipating thermostat including an electric switch, a temperature responsive member responsive to changes in ambient temperature, means for opening and closing the switch actuated by said member, a second temperature responsive member responsive to changes in exterior temperature, and means actuated by the second temperature responsive member to substantially immediately raise the temperature responsiveness of the first temperature responsive member a predetermined degree, within predetermined limits, upon an initial drop in exterior temperature and likewise lower the responsiveness of the first temperature responsive member upon an initial rise in exterior temperature, said means, irrespective of the extent to which the exterior temperature rises or falls operative only throughout the initial stage of exterior temperature change necessary to affect the responsiveness of the first temperature responsive member.

IRA E. McCABE.